(12) United States Patent
Glaser et al.

(10) Patent No.: US 11,885,946 B2
(45) Date of Patent: Jan. 30, 2024

(54) APPARATUSES AND METHODS FOR MULTI-DIRECTION DIGITAL SCANNED LIGHT SHEET MICROSCOPY

(71) Applicant: University of Washington, Seattle, WA (US)

(72) Inventors: Adam K. Glaser, Seattle, WA (US); Jonathan T. C. Liu, Seattle, WA (US)

(73) Assignee: University of Washington, Seattle, WA (US)

( * ) Notice: Subject to any disclaimer, the term of this patent is extended or adjusted under 35 U.S.C. 154(b) by 771 days.

(21) Appl. No.: 16/964,893

(22) PCT Filed: Jan. 25, 2019

(86) PCT No.: PCT/US2019/015254
§ 371 (c)(1),
(2) Date: Jul. 24, 2020

(87) PCT Pub. No.: WO2019/148008
PCT Pub. Date: Aug. 1, 2019

(65) Prior Publication Data
US 2021/0033838 A1   Feb. 4, 2021

Related U.S. Application Data

(60) Provisional application No. 62/622,753, filed on Jan. 26, 2018.

(51) Int. Cl.
*G02B 21/00* (2006.01)
*G01N 21/64* (2006.01)
(Continued)

(52) U.S. Cl.
CPC ..... *G02B 21/0032* (2013.01); *G01N 21/6428* (2013.01); *G02B 21/008* (2013.01);
(Continued)

(58) Field of Classification Search
CPC .............. G02B 21/0032; G02B 21/367; G02B 21/0076; G02B 21/008; G02B 27/0944;
(Continued)

(56) References Cited

U.S. PATENT DOCUMENTS

8,582,203 B2   11/2013   Dunsby
8,935,107 B1   1/2015   Adamovsky et al.
(Continued)

FOREIGN PATENT DOCUMENTS

EP   1912089 B1   8/2016
WO   2017093323 A1   6/2017
(Continued)

OTHER PUBLICATIONS

Glaser, et al., "Multidirectional digital scanned light-sheet microscopy enables uniform fluorescence excitation and contrast-enhanced imaging" Scientific Reports, Mar. 2018, pp. 1-11.
(Continued)

*Primary Examiner* — Mustak Choudhury

(57) ABSTRACT

Embodiments disclosed herein directed to multi-direction digital light sheet microscopy (mDSLM). In mDSLM a sample may be illuminated with an illumination sheet which has a first angular diversity along a first axis and a second angular diversity along a second axis which is orthogonal to the first axis. An mDSLM system includes beam shaping optics which may passively reshape light into the illumination sheet. In some embodiments, scanning optics may be used to scan the illumination sheet with respect to the sample. In some embodiments, a confocal aperture may be used to limit out of focus light which reaches a detector of the mDSLM system.

24 Claims, 7 Drawing Sheets

(51) Int. Cl.
  *G02B 27/09* (2006.01)
  *G02B 27/42* (2006.01)
(52) U.S. Cl.
  CPC ..... *G02B 21/0076* (2013.01); *G02B 27/0944* (2013.01); *G02B 27/425* (2013.01)
(58) Field of Classification Search
  CPC . G02B 27/425; G02B 6/0008; G01N 21/6428
  See application file for complete search history.

(56) References Cited

U.S. PATENT DOCUMENTS

| | | | |
|---|---|---|---|
| 9,086,488 B2* | 7/2015 | Tchoryk, Jr. | G01S 17/58 |
| 9,134,521 B2 | 9/2015 | Huisken | |
| 9,804,378 B2 | 10/2017 | Singer et al. | |
| 9,880,378 B2 | 1/2018 | Taniguchi et al. | |
| 10,061,111 B2 | 8/2018 | Hillman | |
| 10,139,608 B2 | 11/2018 | Huang et al. | |
| 10,983,327 B2* | 4/2021 | Fahrbach | G02B 21/0076 |
| 2009/0244482 A1 | 10/2009 | Elsner et al. | |
| 2010/0007803 A1* | 1/2010 | Hall, Jr. | G02B 27/0966 348/744 |
| 2011/0122488 A1* | 5/2011 | Truong | G02B 21/16 359/385 |
| 2011/0134521 A1* | 6/2011 | Truong | G02B 21/002 359/388 |
| 2012/0099190 A1 | 4/2012 | Knebel et al. | |
| 2013/0314694 A1* | 11/2013 | Tchoryk, Jr. | G01S 17/58 356/28.5 |
| 2014/0307242 A1* | 10/2014 | Solak | G03F 7/70408 355/77 |
| 2014/0320601 A1 | 10/2014 | Cutrale et al. | |
| 2016/0305883 A1* | 10/2016 | Betzig | G02B 21/16 |
| 2017/0371140 A1* | 12/2017 | Cooper | G02B 21/367 |
| 2018/0011303 A1 | 1/2018 | Loy et al. | |
| 2018/0074305 A1* | 3/2018 | Atzler | G02B 21/365 |
| 2018/0078129 A1 | 3/2018 | Vadakke Matham et al. | |
| 2018/0120551 A1 | 5/2018 | Taniguchi et al. | |
| 2019/0324244 A1 | 10/2019 | Kozorovitskiy et al. | |

FOREIGN PATENT DOCUMENTS

| | | |
|---|---|---|
| WO | 2017210159 A1 | 12/2017 |
| WO | 2018050888 A1 | 3/2018 |
| WO | 2019185360 A1 | 10/2019 |

OTHER PUBLICATIONS

Huisken, et al., "Even fluorescence excitation by multidirectional selective plane illumination microscopy (mSPIM)", Optics Letters, vol. 32, No. 17, Sep. 2007, pp. 2608-2610.
Keller, et al., "Reconstruction of zebrafish early embryonic development by scanned light sheet microscopy". Science Magazine, vol. 322, Nov. 2008; pp. 1065-1069.
Salili, S.M. et al., "Eliminating Stripe Artifacts in Light-Sheet Fluorescence Imaging", Review of Scientific Instruments 89, DOI:10.1063/1.5016546, Nov. 20, 2017.
Amat, Fernando et al., "Efficient processing and analysis of large-scale light-sheet microscopy data", Nature Protocol, vol. 10 No. 11, Oct. 1, 2015, p. 1679-96.
Baumgart, Eugen et al., "Scanned light sheet microscopy with confocal slit detection", Optic Express, vol. 20, No. 19, Sep. 7, 2012, p. 21805-14.
Chen, Bi-Chang et al., "Lattice light-sheet microscopy: Imaging molecules to embryos at high spatiotemporal resolution", Science Magazine, vol. 346, Issue 6208, Oct. 24, 2014, p. all.
Chung, Kwanghun et al., "Clarity for mapping the nervous system", Nature Methods, vol. 10, No. 6, Jun. 2013, p. 508-513.
Dean, Kevin M. et al., "Diagonally Scanned Light-Sheet Microscopy for Fast Volumetric Imaging of Adherent Cells", Biophysical Journal, vol. 110, Mar. 29, 2016, p. 1456-65.

Dodt, Hans-Ulrich et al., "Ultramicroscopy: three-dimensional visualization of neuronal networks in the whole mouse brain", Nature Methods, vol. 4, No. 4, Apr. 2007, p. 331-336.
Fahrbach, Florian O. et al., "Microscopy with self-reconstructing beams", Nature Photonics. vol. 4, DOI: 10.1038/nphoton.2010.204, Sep. 2010, p. 780-785.
Flock, Stephen T. et al., "Optical properties of intralipid: A phantom medium for light propagation studies", Lasers in Surgery and Medicine, vol. 12, Issue 5, Jan. 1992, p. 510-519.
Fu, Qinyi et al., "Imaging multicellular specimens with real-time optimized tiling light-sheet selective plane illumination microscopy", Nature Communications, DOI:10.1038/ncomms11088, Mar. 23, 2016, p. all.
Gao, Liang et al., "3D live fluorescence imaging of cellular dynamics using Bessel beam plane illumination microscopy", Nature Protocols, vol. 9, No. 5, p. 1083, Apr. 10, 2014.
Glaser, Adam K. et al., "Fractal propagation method enables realistic optical microscopy simulations in biological tissues", Optica, vol. 3, Issue 8, pp. 861-869, May 3, 2016.
Glaser, Adam K. et al., "Light-sheet microscopy for slide-free non-destructive pathology of large clinical specimens", Nature Biomedical Engineering, vol. 1(7): p. 0084, Jun. 26, 2017.
Gustavsson, Anna-Karin et al., "3D single-molecule super-resolution microscopy with a tilted light sheet", Nature Communications, vol. 9(1), p. 1-8. Jan. 9, 2018.
Huisken, Jan et al., "Even fluorescence excitation by multidirectional selective plane illumination microscopy (mSPIM)", Optics Letters, vol. 32, Issue 17, pp. 2608-2610, Sep. 1, 2007.
Huisken, Jan et al., "Optical sectioning deep inside live embryos by selective plane illumination microscopy", Science Magazine, vol. 305(5686): p. 1007-9, Aug. 13, 2004.
Jacques, Steven L. , "Optical properties of biological tissues: a review", Phys Med Biol, vol. 58(11): p. R37-61, Jan. 11, 2013.
Keller, Philipp J. et al., "Fast, high-contrast imaging of animal development with scanned light sheet-based structured-illumination microscopy", Nature Methods, vol. 7(8): p. 637-42, Jul. 4, 2010.
Keller, Philipp J. et al., "Reconstruction of zebrafish early embryonic development by scanned light sheet microscopy", Science Magazine, vol. 322(5904): p. 1065-9, Nov. 14, 2008.
Kumar, Abhishek et al., "Dual-view plane illumination microscopy for rapid and spatially isotropic imaging", Nature Protocols, vol. 9(11): p. 2555-2573, Oct. 9, 2014.
Liu, Jian et al., "Elliptical mirror-based TIRF microscopy with shadowless illumination and adjustable penetration depth", Optics Letters, vol. 42(13), p. 2587-2590, May 11, 2017.
Medeiros, Gustavo De et al., "Confocal multiview light-sheet microscopy", Nature Communications, vol. 6, Apr. 20, 2015.
Power, Rory M. et al., "A guide to light-sheet fluorescence microscopy for multiscale imaging", Nature Methods, vol. 14(4): p. 360-373, Apr. 2017.
Reynaud, Emmanuel G. et al., "Guide to light-sheet microscopy for adventurous biologists", Nature Methods, vol. 12: p. 30-34, Jan. 2015.
Richardson, Douglas S. et al., "Clarifying Tissue Clearing", Cell, vol. 162(2): p. 246-57, Jul. 16, 2016.
Rohrbach, Alexander , "Artifacts resulting from imaging in scattering media: a theoretical prediction", Optics Letters, vol. 34, Issue 19, pp. 3041-3043, Oct. 1, 2009.
Rohrbach, Alexander et al., "Self-reconstructing sectioned Bessel beams offer submicron optical sectioning for large fields of view in light-sheet microscopy", Optics Express, vol. 21, Issue 9, pp. 11425-11440, May 2, 2013.
Scherf, Nico et al., "The smart and gentle microscope", Nature Biotechnology, vol. 33(8): p. 815-818. Aug. 2015.
Schmitt, Joseph M. et al., "Optical scattering properties of soft tissue: a discrete particle model", Applied Optics, vol. 37, Issue 13, pp. 2788-2797, May 1, 1998.
Sheppard, Colin J. , "Fractal model of light scattering in biological tissue and cells", Optics Letters, vol. 32, Issue 2, pp. 142-144, Jan. 15, 2007.

(56) References Cited

OTHER PUBLICATIONS

Siedentopf, H. V. et al., "Über Sichtbarmachung und Größenbestimmung ultramikoskopischer Teilchen, mit besonderer Anwendung auf Goldrubingläser", Annalen der Physik, vol. 315(1): p. 1-39, Oct. 13, 1902.

Stelzer, Ernst H. et al., "Fundamental reduction of the observation volume in far-field light microscopy by detection orthogonal to the illumination axis: confocal theta microscopy", Optics Communications, vol. 111: p. 536-547, Oct. 15, 1994.

Strnad, Petr et al., "Inverted light-sheet microscope for imaging mouse pre-implantation development", Nature Methods, vol. 13: p. 139-142, Feb. 2016.

Theer, Patrick et al., "The monolithic light sheet-based fluorescence microscope (mDSLM)", Introduction: Seminal References, 69117, 2014.

Truong, Thai V. et al., "Deep and fast live imaging with two-photon scanned light-sheet microscopy", Nature Methods, vol. 8(9): p. 757-760, Sep. 2011.

Vettenburg, Tom et al., "Light-sheet microscopy using an Airy beam", Nature Methods, vol. 11: p. 541-544, May 2014.

Zanacchi, Francesca C. et al., "Live-cell 3D super-resolution imaging in thick biological samples", Nature Methods, vol. 8: p. 1047-1049, Dec. 2011.

Zong, Weijian et al., "Two-photon three-axis digital scanned light-sheet microscopy (2P3A-DSLM)", SPIE Optical Engineering Applications, vol. 91980W-91980W-6, Sep. 5, 2014.

\* cited by examiner

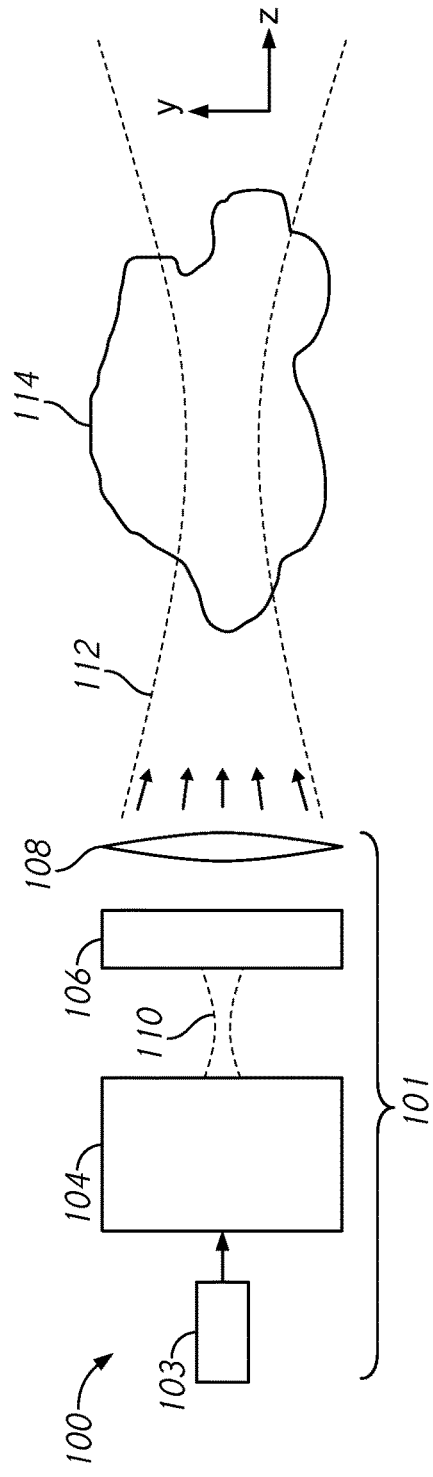
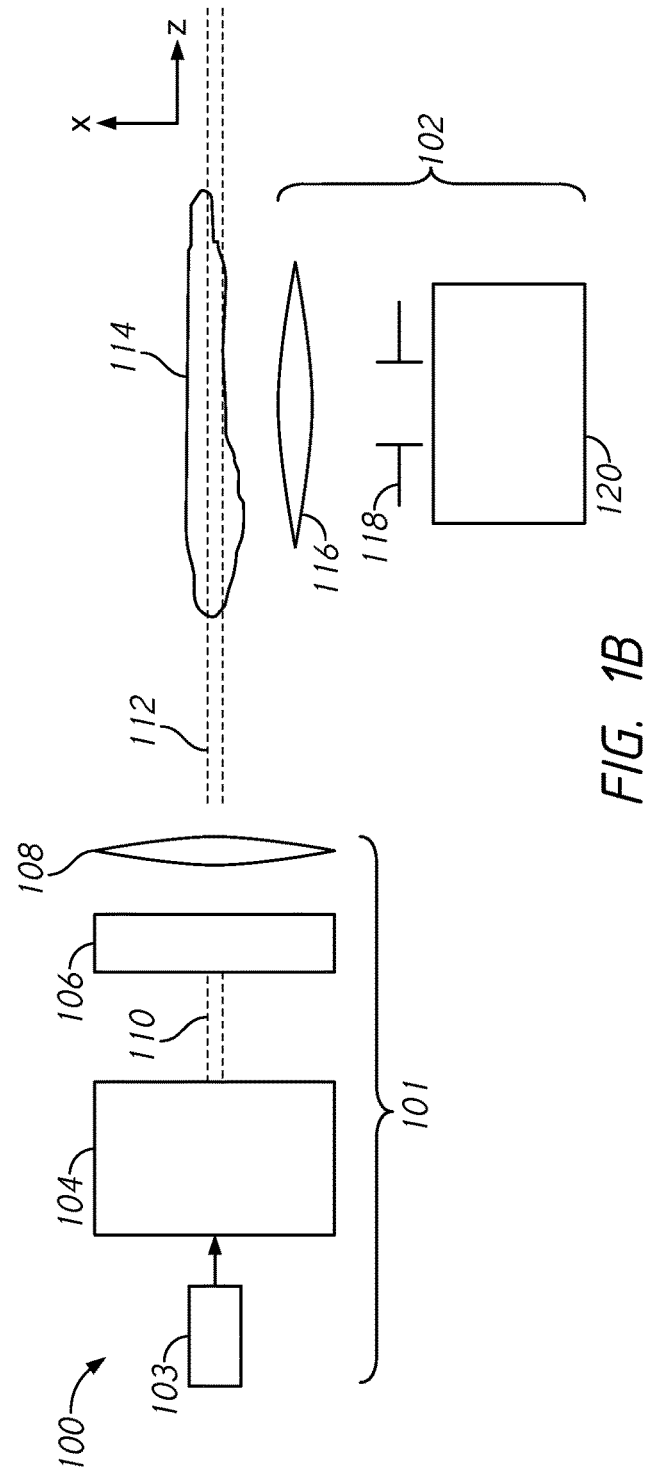

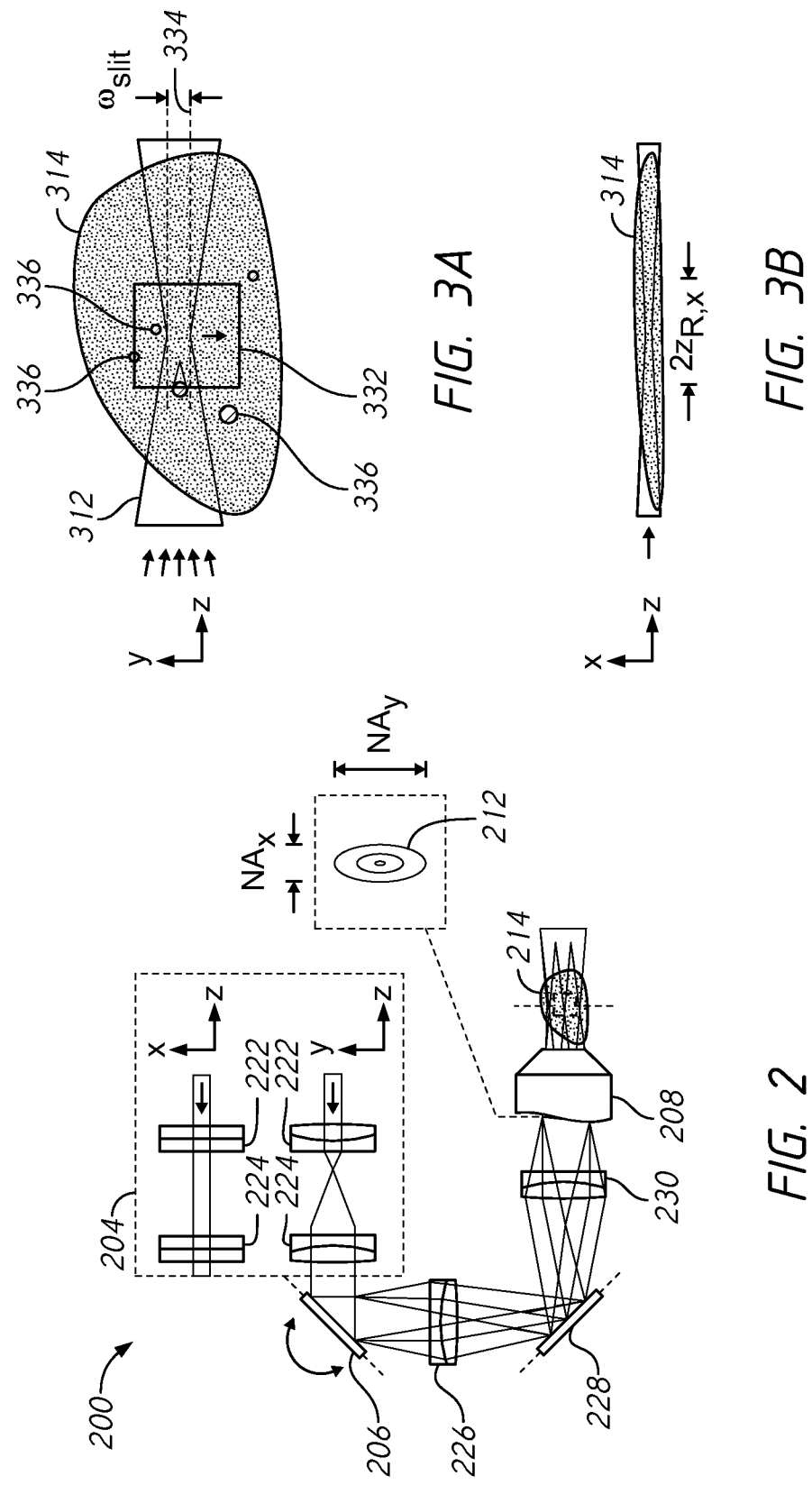

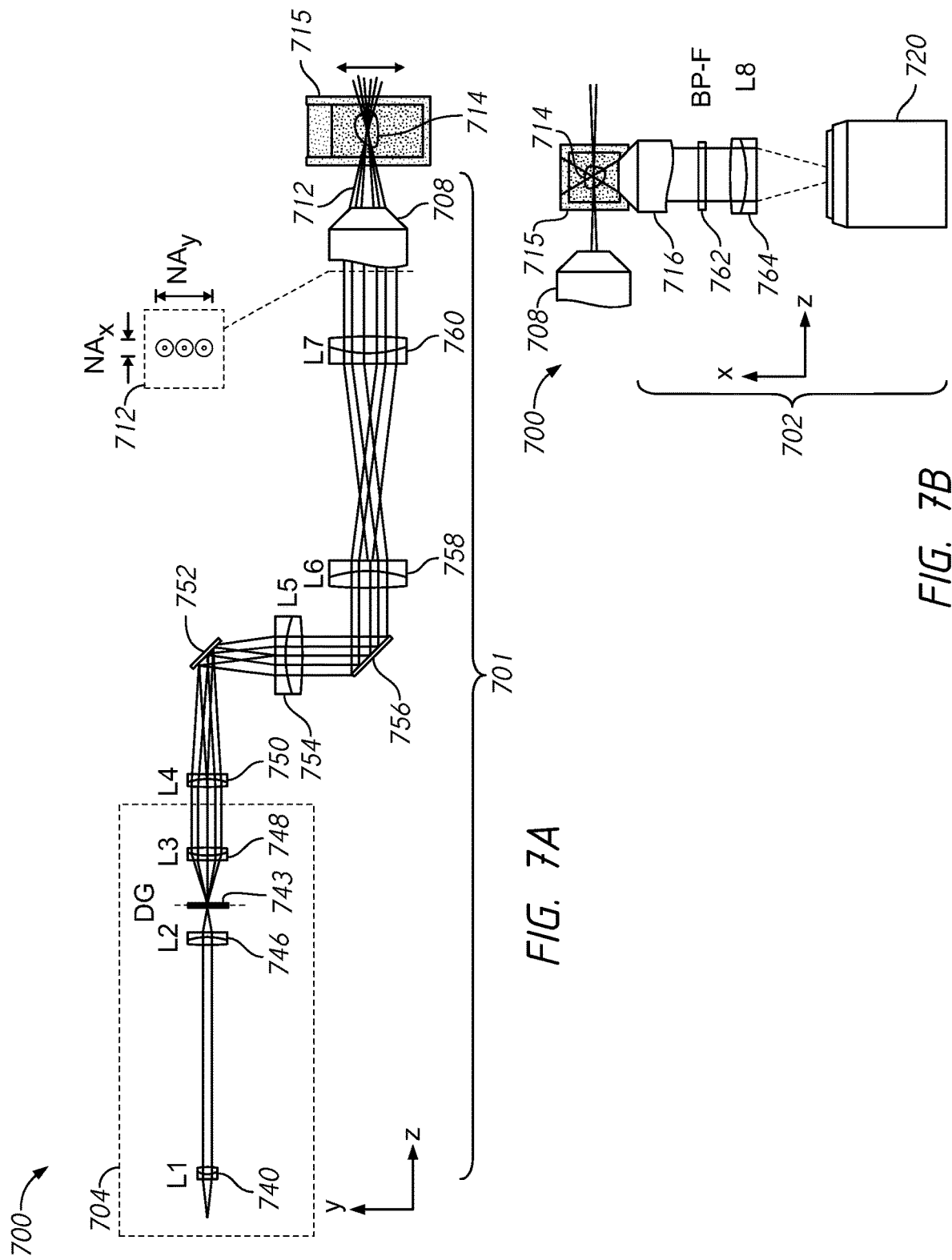

APPARATUSES AND METHODS FOR MULTI-DIRECTION DIGITAL SCANNED LIGHT SHEET MICROSCOPY

CROSS-REFERENCE TO RELATED APPLICATION(S)

This application claims the benefit of U.S. Provisional Application No. 62/622,753, filed Jan. 26, 2018, the entire contents of which are hereby incorporated by reference herein.

GOVERNMENT LICENSE RIGHTS

This application is a 35 U.S.C. § 371 National Stage Application of PCT Application No. PCT/US2019/015254, filed Jan. 25, 2019, which claims the benefit of U.S. Provisional Application No. 62/622,753, filed Jan. 26, 2018, the entire contents of which are hereby incorporated by reference, in their entirety, for any purposes.

BACKGROUND

Microscopy may generally involve directing light onto a sample, and then imaging the sample based on light received from the sample. In order to obtain high quality images of an entire field of view, the field of view needs to be evenly illuminated. In situations where the sample is long along the axis that the illumination light is propagating, certain structures within the sample may block the illumination light from reaching parts of the field of view which are in the shadow of the occlusion.

In addition, there are many applications where it may be desirable to obtain images in a highly scattering medium. For example, biological tissues which contain a number of components and structures which are highly scattering may be imaged for diagnostic and/or research purposes. It may be difficult to obtain high quality images of a particular focal region in a scattering medium, because out of focus light scattered from outside the focal region may also reach the detector. A variety of approaches may be used to limit the out of focus light.

SUMMARY

In at least one aspect, the present disclosure relates to an apparatus which may include a light source which emits a beam of light, illumination optics, and collection optics. The illumination optics may provide an illumination sheet based on the beam of light and may illuminate a sample with the illumination sheet. The illumination sheet has a first angular diversity along a first axis and a second angular diversity along a second axis orthogonal to the first axis. The first angular diversity may be greater than the second angular diversity. The collection optics may receive light from the sample along the second axis.

The illumination optics may include beam shaping optics configured to passively reshape the beam of light into the illumination sheet. The beam shaping optics may include a cylindrical telescope. The beam shaping optics may split the beam of light into a plurality of illumination beams. Each of the illumination beams lies in a plane and each of the illumination beams has a different angle in the plane. The beam shaping optics may include a diffraction grating. Each of the plurality of illumination beams may be a Gaussian pencil beam. Each of the plurality of illumination beams may be a light sheet, and the plurality of light sheets may overlap with each other. The apparatus may include scanning optics configured to dither the illumination sheet with respect to the sample.

The sample may include obstructions. The illumination sheet may illuminate regions of the sample occluded by the obstructions based on the first angular diversity. The sample may include at least one fluorophore. The illumination sheet may excite the at least one fluorophore. The collection optics may receive emission light emitted by the excited ones of the at least one flourophores. The illumination sheet has a first numerical aperture along the first axis and a second numerical aperture along the second axis. The first numerical aperture is greater than the second numerical aperture. The sample may be a biological tissue.

The apparatus may also include scanning optics and a detector. The scanning optics may scan the illumination beam along the first axis across the sample. The detector may be coupled to the collection optics and may image a plane which includes the second axis and a third axis orthogonal to the first and the second axis based on the received light. The apparatus may also include a confocal aperture configured to reject out of focus portions of the light from the sample. A rolling shutter of the detector may act as the confocal aperture. A speed of the rolling shutter may be synchronized to a scan rate of the scanning optics In at least one aspect, the present disclosure relates to a method. The method includes directing an illumination sheet at a sample. The illumination sheet includes a first angular diversity along a first axis and a second angular diversity along a second axis orthogonal to the first axis. The first angular diversity is greater than the second angular diversity. The method also includes receiving light from the sample. The received light is based on the illumination sheet.

The sample may include at least one fluorophore. The illumination sheet may include an excitation wavelength of the at least one fluorophore and the received light may include an emission wavelength of the at least one fluorophore.

The method may also include generating illumination light form a light source and shaping the illumination light into the illumination sheet. The shaping the illumination light into the illumination sheet may include splitting the illumination light into a plurality of illumination beams. Each of the plurality of illumination beams approaches a focal point in the sample from a different angle. Each of the plurality of illumination beams may include a light sheet. The method may also include dithering the illumination sheet with respect to the sample. The shaping the illumination light into the illumination sheet may include changing the size of the illumination light along one of the first or the second axis with a cylindrical telescope.

The method may also include scanning the illumination sheet across the sample. The method may also include rejecting an out of focus portion of the received light from the sample with a confocal aperture.

BRIEF DESCRIPTION OF THE DRAWINGS

FIGS. 1A and 1B are block diagrams of a top view and a side view, respectively, of an mDSLM system according to an embodiment of the present disclosure.

FIG. 2 is a schematic diagram of illumination optics which may be used provide an illumination sheet with a generally elliptical cross section in accordance with an embodiment of the present disclosure.

FIGS. 3A and 3B are block diagrams showing a top view and a side view, respectively, of the interaction of an illumination sheet with a sample.

FIGS. 7A and 7B are schematic diagrams showing a side and top view, respectively, of an example implementation of a mDSLM microscope which uses an illumination sheet with multiple discrete beams according to an embodiment of the present disclosure.

DETAILED DESCRIPTION OF PREFERRED EMBODIMENTS

Figures 4A, 4B:
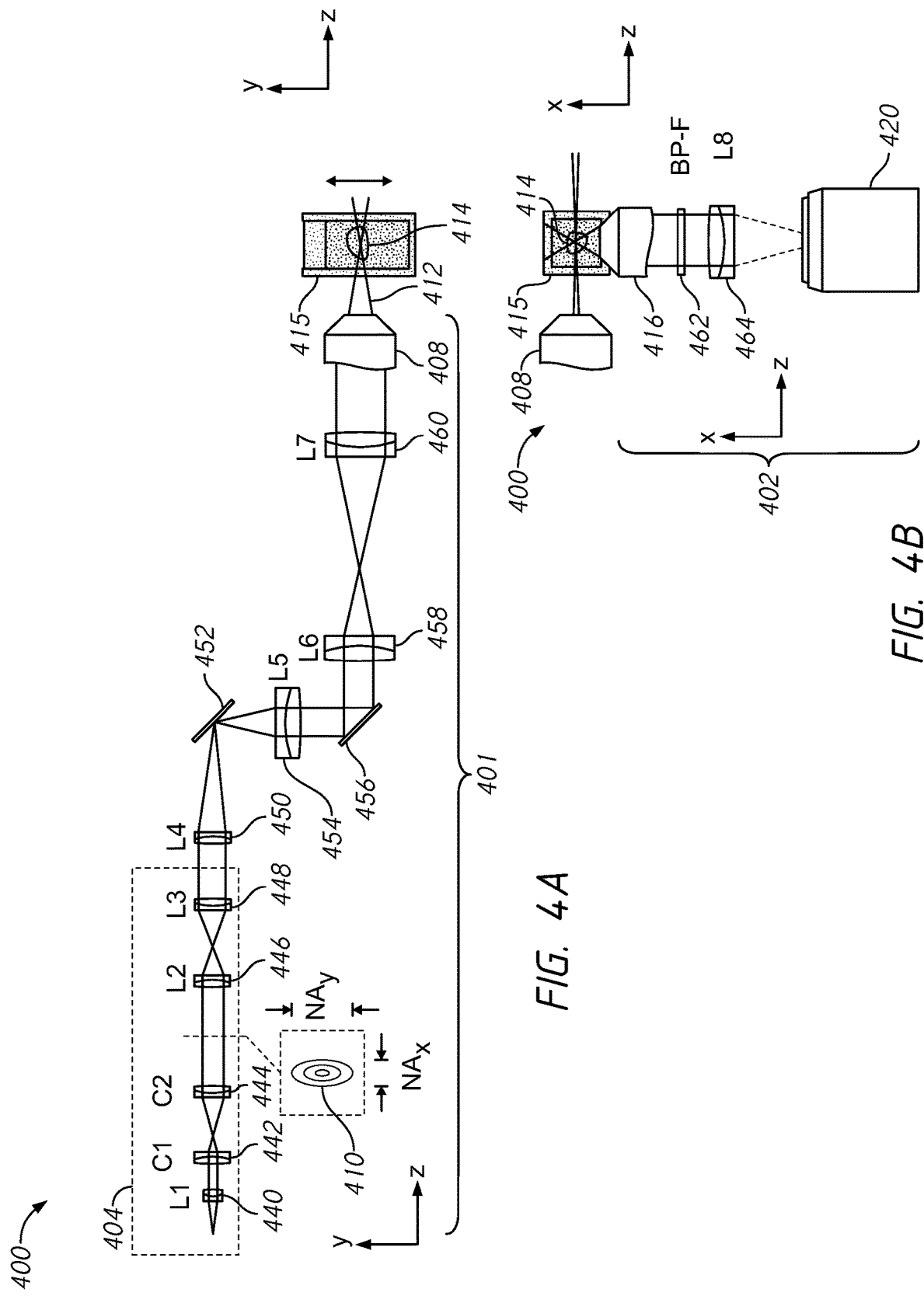
FIGS. 4A and 4B are schematic diagrams showing a side and top view, respectively, of an example implementation of a mDSLM microscope which uses an illumination sheet with a generally elliptical cross section according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Microscopy may be used in a wide array of applications to produce images of a sample, usually with a field of view and/or resolution which are not normally visible to the naked eye. Illumination light may be directed onto a sample with illumination optics. Collection optics may be used to collect light from the sample onto a detector (for example, a CCD detector, a CMOS detector, or a user's eyes). In some instances, the light which reaches the detector may include a portion of the illumination light. In some instances, the light which reaches the detector may be emitted from the sample (e.g., via fluorescence) after being stimulated to emission by the illumination light. It may be desirable to ensure that the field of view receives even illumination and to ensure that the illumination penetrates the depth of the sample.

The illumination optics and/or the collection optics may be focused on a particular focal region of the sample. It may be desirable to reject light which comes from outside of the focal region. Optical sectioning may be used to limit the region which is illuminated and/or the region which light is received from such that light from outside of the focal region is generally rejected.

Light sheet microscopy achieves both even illumination and optical sectioning (rejection of out-of-focus light) by exciting fluorescence along a thin 2D illumination "light sheet" within a sample, which is imaged in the orthogonal direction with a detector. The illumination and collection optics are decoupled from each other each may be separately optimized to increase imaging performance. The right angle geometry of the illumination and collection optics may be useful to reduce the amount of illumination light which directly reaches collection optics. This in turn, may be useful for certain types of microscopy such as fluorescence microscopy or dark field microscopy.

Some sample types (e.g., biological tissues) may be highly scattering and/or may include various structures and/or other obstructions which occlude the light. In samples with high scattering, light which is outside of the focal region may be scattered, and may reach the detector. This out of focus light in the image may degrade the quality of the image by, for example, causing blurriness. In samples with obstructions that occlude light, the light sheet may be prevented from reaching parts of the sample which are behind the occlusion (e.g., in the occlusion's shadow). The lack of illumination light in these shadows may prevent certain parts of the image from being effectively imaged. It may be desirable to develop a microscope which mitigates the effects of both out-of-focus light due to scattering and ensures even illumination throughout the depth of the sample.

The present disclosure is directed to multi-directional digital scanned light sheet microscopy (mDSLM). In mDSLM, the illumination light which is directed onto the sample has a higher angular diversity along one axis than it does along a second axis orthogonal to the first. As explained in more detail herein, the higher angular diversity means that the illumination light approaches the focal region from a wider range of angles in one plane than it does in the orthogonal plane. The higher angular diversity of the light along the first axis allows the illumination light to reach objects which are located 'behind' an occlusion, since at least some of the illumination light approaches from an angle, and is not blocked by the occlusion. Having a lower angular diversity (e.g., the light is more parallel/less tightly focused) in the second axis may allow the illumination light to penetrate further through the sample. The high angular diversity of the light in one axis but not another may be achieved passively e.g., with no scanning or other moving parts). In some embodiments, the illumination light may also be scanned through the tissue, and a confocal slit may be used to further reject out of focus light from the sample. This may reduce the out-of-focus light which reaches the detector, which in turn may reduce the effects of scattering in the sample on the image.

FIGS. 1A and 1B are block diagrams of a top view and a side view, respectively, of an mDSLM system according to an embodiment of the present disclosure. FIG. 1A shows a top down view of the mDSLM system 100, and FIG. 1B shows a side view of the mDSLM system 100. In FIG. 1A, the collection optics 102 (which would be below the sample 114 in the view of FIG. 1A) are omitted for clarity of illustration. The mDSLM system 100, or mDSLM system 100, includes illumination optics 101 and collection optics 102, as well as a sample 114. The illumination optics 101 includes a light source 103, beam shaping optics 104, which reshape the light from the light source 103 into an illumination sheet 110. The illumination optics 101 may also include scanning optics 106 and/or objective optics 108, which may direct the illumination sheet 110 into illumination sheet 112, which illuminates the sample 114. The collection optics 102 may include collection objective optics 116, a confocal aperture 118, and a detector 120.

The illumination optics 101 produce an illumination sheet 112, which is directed to a sample 114. The illumination sheet may have a larger angular diversity along a first axis (e.g., the y-axis), than it does in a second axis (e.g., the x-axis) which is orthogonal to the first axis. The illumination sheet 112 may generally propagate along a third axis (e.g., the z-axis) which is orthogonal to both the first and the second axis. The collection optics 102 may be arranged so that they image the plane with the first and third axis (e.g., the y-z plane). In other words, the collection optics 102 may generally have an axis (e.g., a normal to the collection objective optics 116) which is orthogonal to the first and third axis (e.g., orthogonal to the y-z plane) which may also be described as lying along the second axis (the x-axis).

The light source 103 may generate light, which may be used to form the illumination sheet 112. In some embodiments, the light source may be a narrow band source, such as a laser or a light emitting diode (LED) which may emit light in a narrow spectrum. In some embodiments, the light may be a broadband source (e.g., an incandescent source, an arc source) which may produce broad spectrum (e.g., white) illumination. In some embodiments, one or more portions of the illumination light may be outside of the visible range. In some embodiments, a filter (not shown) may be used to further refine the wavelength(s) of light in the illumination optics 101. In some embodiments, the light source 103 may be a laser, and may generate collimated light.

In some embodiments, the mDSLM system 100 may be used to image fluorescence in the sample 114. The illumination sheet 112 may include light at a particular excitation wavelength, which may excite flourophores in the sample 114. The illumination sheet 112 may include a broad spectrum of light which includes the excitation wavelength, or may be a narrow band centered on the excitation wavelength. In some embodiments, the light source 103 may produce a narrow spectrum of light centered on (or close to) the excitation wavelength). In some embodiments, filter(s) (not shown) may be used in the illumination Optics 102 to limit the illumination sheet 112 to wavelengths near the excitation wavelength. Once excited by the illumination sheet, the fluorophores in the sample 114 may emit light (which may be centered on a given emission wavelength). The collection optics 102 may include one or more filters which may be used to limit the light which reaches the detector 120 to wavelengths of light near the emission wavelength.

The beam shaping optics 104 may passively reshape the light it receives, and provide the reshaped light. The beam shaping optics 104 may receive light from the light source 103, and may provide an illumination sheet 110, which may be redirected and/or further shaped or focused to become the illumination sheet 112 at the sample. The beam shaping optics 104 may be passive optics, which may reshape the light from the light source 103 with passive optics without scanning the light. For example, the beam shaping optics 104 may utilize lenses, mirrors, diffraction gratings, and/or other passive optical elements.

In some embodiments, the beam shaping optics 104 may reshape a profile an illumination beam provided by the light source 103. For example, the beam shaping optics 104 may reshape the beam such that it has a generally elliptical cross section. For example, the illumination sheet 112 may be a Gaussian beam with a higher numerical aperture along the first axis (e.g., the y-axis) than along the second axis (e.g., the x-axis). FIGS. 2-4B discuss an example embodiment which uses a beam with an elliptical cross section in more detail. In some embodiments, a non-Gaussian beam may be used which has a higher angular diversity in one axis than along the orthogonal axis. For example, the illumination sheet 112 may be a Bessel or Airy beam.

In some embodiments, the beam shaping optics 104 may split the light from the light source 103 into a plurality of beams. These beams may together form the illumination sheets 110 and 112. The plurality of beams may all lie in the same plane (e.g., in the y-z plane) but may be non-parallel such that they converge at the focal region in the sample 114. This may increase the angular diversity of the illumination sheet 112 entering the sample 114. FIGS. 5-7B discuss an example embodiment with a plurality of beams in more detail.

In some embodiments, the beam shaping optics 104 may both reshape the light and split the light into a plurality of beams or sheets. For example, the beam shaping optics 104 may reshape the light into a flat sheet and also split the light into a plurality of flat sheets. In some embodiments, these flat sheets may be co-planar but non-parallel such that they converge at the focal region in the sample 114. In some embodiments, at least a portion of each of the plurality of flat sheets may overlap with each other. FIGS. 8-10B discuss an embodiment with a plurality of overlapping light sheets in more detail.

The illumination optics 101 may also include optional scanning optics 106. In some embodiments, where the illumination sheet 112 illuminates an area of the sample 114 which is smaller than an area that is desired to be imaged, the scanning optics 106 may move or scan the illumination sheet 112 relative to the sample 114. The resulting image may then be built up over time as the illumination sheet 112 illuminates different areas of the sample 114 over time.

The illumination optics 101 may also include illumination objective optics 108, which may focus the illumination sheet 112 onto a particular focal region of the sample 114. In some embodiments, the illumination objective optics 108 may include a pre-packaged objective lens, which may include a plurality of individual lenses coupled together.

The illumination sheet 112 may be directed onto the sample 114. The sample 114 may be placed directly onto the mDSLM system 100 or may be packaged (e.g., on a microscope slide, in a cuvette, in a wellplate, etc.). In some embodiments, the sample 114 may be processed before imaging on the mDSLM system 100. For example, the sample 114 may be washed, sliced, and/or labelled before imaging.

In some embodiments, the sample may be a biological sample. For example, the sample 114 may be a tissue which has been biopsied from an area of suspected disease (e.g., cancer). In some embodiments, the tissue may undergo various processing, such as optical clearance, tissue slicing, and/or labeling before being examined by the mDSLM system 100. In some embodiments, examination of the tissue with the mDSLM system 100 may be used for diagnosis, to determine treatment progress, to monitor disease progression, etc.

In some embodiments, the sample 114 may be non-biological. For example, the sample 114 may be a fluid, and may contain one or more components for investigation. For example, the sample 114 may be a combustion gas, and the mDSLM system 100 may perform particle image velocimetry (PIV) measurements to characterize components of the gas.

In some embodiments, the sample 114 may include one or more types of flourophores. The flourophores may be intrinsic to the sample 114 (e.g., DNA and proteins in biological samples) or may be a fluorescent label (e.g., acridine orange, Eosin) applied to the sample 114. Some samples 114 may include a mix of intrinsic types of flourophores and fluorescent labels. Each type of fluorophore may have an excitation spectrum, which may be centered on an excitation wavelength. When a fluorophore is excited by light in the excitation spectrum, it may emit light in an emission spectrum, which maybe centered on an emission wavelength which is different than (e.g., red-shifted from) the excitation wavelength.

The illumination optics 101 may generate the illumination sheet 112 such that it includes light in the excitation spectrum(s) of one or more fluorophores in the sample 114. In some embodiments, the illumination sheet 112 may primarily consist of a single wavelength, which excites a particular fluorophore. In some embodiments, the light source 103 may be chosen to produce light at a particular wavelength. In some embodiments, one or more filters may be used in the illumination optics 101. In some embodiments, the filters may be swapped in and out of the light path to change the wavelength of the illumination sheet 112 in order to excite different flourophores in the sample 114.

In a similar manner, the collection optics 102 may be configured to receive light which includes wavelength(s) which is/are within the emission spectrum of one or more flourophores. For example, the collection optics 102 may include a filter centered around a peak emission wavelength of a fluorophore. As with the filter in the illumination optics 101, the filter in the collection optics 102 may be easily interchangeable to allow for multiple fluorophores to be imaged. In some embodiments, since the illumination sheet 112 generally propagates along an axis (e.g., the z-axis) orthogonal to the axis (e.g., the x-axis) that the collection optics 102 collect light along, minimal or no filtering may be needed.

In some embodiments, the mDSLM system 100 may include a stage and/or sample holder, which may support or otherwise hold the sample 114. For example, the mDSLM system 100 may include a cuvette holder, which may support a cuvette which may in turn hold the sample 114. In some embodiments, the stage/sample holder may help to position the sample 114 in a particular relationship with the illumination optics 101 and/or collection optics 102. In some embodiments, the stage/sample holder may be adjustable, so that the position of the sample 114 may be changed. In some embodiments, the stage/sample holder may include actuators and may be movable in response to computer commands, either provided by a user or automatically.

The collection objective optics 116 receives light from the sample 114 and directs it towards the detector 120. The collection objective optics 116 may generally receive light which falls within a collection angle of an axis of the collection optics 102. The axis of the collection optics may generally be orthogonal to illumination sheet (e.g., may be orthogonal to the y-z plane). Similar to the illumination objective optics 108, in some embodiments the collection objective optics 116 may be packaged together into a single optical element which includes a plurality of coupled lenses.

The detector 120 may receive light from the sample. In some embodiments, the detector 120 may be an eyepiece (for example, a monocular or binocular eyepiece) which may allow a user to view an image of the sample 114. In some embodiments, the detector 120 may be a camera, such as a digital camera, which may capture the image of the sample 114. For example, the detector 120 may be a sCMOS camera. In some embodiments, the detector 120 may build an image over time of the sample 114, as the illumination sheet 112 is scanned through different parts of the sample 114.

In some embodiments, the detector 120 may be coupled to a storage system (e.g., a hard drive of a computer) and images recorded by the detector 120 may be saved for later viewing. In some embodiments, the detector 120 may output images to a display (not shown) which may be viewed by a user of the system. The view on the display may be a real-time view of the sample 114 or may be used to review previously acquired images. In some embodiments, a position of the illumination sheet 112 and/or collected light with respect to the sample 114 may be recorded, and a 2D or 3D dataset may be generated from the images. In some embodiments, the images may be tiled to form a larger image than that which is captured by a single field of view of the detector 120.

The confocal aperture 118 may be used to limit the amount of out of focus light which reaches the detector. In some embodiments, the confocal aperture 118 may be a physical aperture, such as a slit, which is used to physically block light before it reaches the detector 120, in some embodiments where the illumination sheet 112 is scanned across the sample 114, the confocal aperture 118 may be scanned a rate synchronized to the scan rate of the illumination sheet 112. In some embodiments, the collection optics 102 may include additional de-scanning optics synchronized to the scanning optics 106 and a stationary confocal aperture 118.

In some embodiments, a separate confocal aperture 118 may not be needed, and the effect of a confocal aperture may be achieved based on properties of the detector 120. For example, if the detector is a digital camera, the effect of a confocal aperture may be achieved by synchronizing the shutter of the camera, in which a single column of pixels are active at a time, to the scan rate provided by the scanning optics 106. This may allow the shutter of the digital camera to act as a confocal aperture 118 which is effectively scanned across the face of the detector 120.

In some embodiments, the mDSLM system 100 may be packaged into a microscope. Rails and/or other supports may be used to hold the illumination optics 101 and the collection optics 102 in relation to each other and in relation to a sample holder/stage which may support the sample 114. A housing may enclose all or part of the components of the mDSLM microscope. In sonic embodiments, the mDSLM system 100 may have modular components, which may be allow for one or more components of the collection and/or illumination optics 101, 102 to be easily exchanged, based on the current application. For example, the illumination optics 101 and/or collection optics 102 may separately contain one or more filters, which may have wavelengths based on a given fluorophore. The filter(s) may be in a modular holder to allow for different filters corresponding to different fluorophores to be used.

In some embodiments, the microscope may be coupled to a computer which may receive data from the detector 120 and/or control the operation of one or more components of the microscope. For example, the computer may control positioning of the sample with respect to the illumination optics 101 and/or collection optics 102. In some embodiments, the computer may he integrated into the mDSLM system 100. In some embodiments, the computer may he a general purpose computer which is coupled to the mDSLM system 100. In some embodiments, the computer may include one or more user input and user interface features (e.g., a display, a touchscreen display, a mouse and keyboard, etc.), which may allow a user to interact with the mDSLM system 100.

While a particular arrangement of the components of the illumination optics 101 and the collection optics 102 are shown in FIGS. 1A and 1B, it should be understood that other arrangements may be used in other embodiments. For example the order of parts in the illumination optics 101 and/or collection Optics 102 may be changed. Similarly, in some embodiments, the elements of FIGS. 1A and 1B may be split, replicated, and/or combined. For example, in some embodiments the confocal aperture 118 may part of the detector 120. While the illumination optics 101 and collection optics 102 are generally shown as coaxial in the example illustration of FIGS. 1A and 1B, it should be understood that this is for clarity of illustration only, and that the components of the mDSLM system 100 may take on any configuration. For example, mirrors and/or optical fibers may be used in other example embodiments of the mDSLM system 100. Similarly, although transmissive optics are shown in the example of FIGS. 1A and 1B, it should be understood that reflective optics may be used in other example embodiments.

It should be understood that while terms like 'top' and 'side' are used for ease of explanation, other embodiments may use other arrangements of components. For example, FIG. 1B may he considered to be the top view, while FIG. 1A is a view of the side in some embodiments. Similarly, any arrangement of the illumination and collections optics 101, 102 with respect to the sample 114 may be used as long as the collection optics 102 receive light from a plane which is orthogonal to the direction of illumination from the illumination optics 101. For example, in some embodiments the illumination sheet 112 may enter the sample 114 at a 45° angle, while collection optics 102 may receive light from a plane at a 45° angle to the sample 114.

For the purposes of consistency between the figures, an x-y-z coordinate system is used where the z-axis is propagation direction of the illumination sheet 112, the y-axis is the axis along which the illumination sheet 112 has relatively higher angular diversity, and the x-axis is the axis along which the illumination sheet 112 has relatively lower angular diversity. It should be understood that this x-y-z coordinate system may have any relation to a coordinate system of the room, and that the orientation of the various mDSLM systems described herein may have different orientations with regards to the room.

FIG. 2 is a schematic diagram of illumination optics which may be used provide an illumination sheet with a generally elliptical cross section in accordance with an embodiment of the present disclosure. The illumination optics 200 may be used to implement all or a portion of the illumination optics 101 of FIG. 1. The illumination optics 200 include beam shaping optics 204, a scanning mirror 206, a lens 226, a mirror 228, a lens 230, and an objective 208. The illumination optics 200 may generate an direct an illumination sheet 212 onto a sample 214.

In the embodiment of FIG. 2, the beam shaping optics 204 may produce an illumination sheet 212 which has a first numerical aperture along a first axis (e.g., a y-axis) and a second numerical aperture along a second axis (e.g., a y-axis). FIG. 2 includes an inset which shows a cross section of the illumination sheet 212 at a back focal plane (BFP) of the illumination objective 208. In some embodiments, the illumination sheet 212 may be a Gaussian beam with an elliptical cross section due to a larger numerical aperture along a first axis (NAy) than along the second axis (NAx). In some embodiments, NAy may be a multiple of NAx. For example, NAy may be about 0.18, while NAx may be about 0.06. Other values of numerical aperture may be used in other example embodiments, The beam shaping optics 204 may receive a beam with a generally circular cross section from a light source (e.g., the light source 103 of FIG. 1), and may reshape it into a beam with a generally elliptical cross section. The reshaped beam may be more tightly focused (e.g., have a higher numerical aperture) along the longer axis of the ellipse than along the short axis of the ellipse.

In some embodiments, the beam shaping optics 204 may include a cylindrical telescope. The cylindrical telescope may include a first cylindrical lens 222 and a second cylindrical lens 224. FIG. 2 shows an inset which includes a view of a cross section of the cylindrical telescope along a first plane (e.g., the x-z plane) and a second cross section along a second plane (e.g., the y-z plane) which is orthogonal to the first plane. The first and second cylindrical lenses 222, 224 may generally be flat in the first plane, but may have a curvature (e.g., an optical power) along the second plane. As may be seen, this may leave the beam relatively unchanged along the x-axis, but may expand the beam along the y-axis. Since the y-axis is expanded more than the x-axis, the beam may take on an elliptical cross section.

The scanning mirror 206 may redirect light received from the beam shaping optics 204. The scanning mirror 206 may be coupled to an actuator which may rapidly deflect the mirror through a range of rotational angles about a centerline of the scanning mirror 206. The deflection of the scanning mirror 206 may, in turn, deflect the illumination sheet as it reflects from the scanning mirror 206.

The light from the scanning mirror 206 may pass through a lens 226, which may be a scan lens. The lens 226 may focus the light onto a second mirror 228, which may redirect the light towards the illumination objective 208. A second lens 230 may act as a tube lens and may refocus light from the mirror 228 into a back focal plane of the illumination objective 208. The illumination objective 208 in turn focuses the illumination sheet 212 onto the sample 214.

FIGS. 3A and 3B are block diagrams showing a top view and a side view, respectively, of the interaction of an illumination sheet with a sample. The illumination sheet 312 may be an illumination beam with an elliptical cross-section, which may be provided by the illumination optics 200 of FIG. 2, FIG. 3A shows a top down view, and shows a plane in which the illumination sheet 312 has a first numerical aperture NAy. FIG. 3B shows a side view which shows a plane in which the illumination sheet 312 has a second numerical aperture NAx which is smaller than NAy. As may be seen from FIG. 3B, because NAx is relatively low, the light may have a long depth of penetration through the sample 314 along the z-axis.

The top view of FIG. 3A shows how the illumination sheet 312 may interact with the sample. The sample 314 may include a number of occlusions 336 (e.g., solid structures or other obstructions), which may prevent light incident on one side of the occlusion from reaching the other side of the occlusion (e.g., are opaque to the light). As schematically represented in FIG. 3A, since the illumination sheet 312 has a large angular diversity (e.g., due to the high numerical aperture), some of the light may pass around the occlusions 336, such that there is a relatively small shadowed region behind each of the occlusions 336. In this manner the illumination sheet may illuminate regions which would normally be occluded behind an obstruction based on the (relatively) large angular diversity allowing light to pass around the obstruction.

The box 332 represents a field of view of the collection optics. The dashed lines 334 represent the width of a confocal slit which may be used as the confocal aperture (e.g., confocal aperture 118 of FIG. 1) of the system. Light outside the dotted lines 334 may generally be rejected while light inside the dotted lines 334 may generally be accepted (e.g, recorded by a detector of the system). Due to the motion of the scanning mirror 206 of FIG. 2, the illumination sheet 312 may be scanned across the sample 314. In the example geometry of FIGS. 3A-3B, the illumination sheet 312 may be scanned up and down (e.g., along the y-axis). The confocal aperture represented by the dashed lines 338 may be synchronized such that it scans with the illumination sheet 312. In this manner, the sample may be illuminated with angular diversity in one plane, while still maintaining long penetration in the z-axis and rejection of out of focus light.

FIGS. 4A and 4B are schematic diagrams showing a side and top view, respectively, of an example implementation of a mDSLM microscope which uses an illumination sheet with a generally elliptical cross section according to an embodiment of the present disclosure. The mDSLM microscope 400 may be an implementation of the mDSLM systems 100 of FIG. 1 and 200 of FIG. 2.

As may be noted, FIGS. 4A and 4B are rotated relative to FIG. 1, such that the plane of the illumination sheet 412 with higher angular diversity is visible from the side view rather than the top view. For consistency, the axis labels will be kept the same relative to the illumination sheet 412.

The mDSLM microscope 400 includes illumination optics 401 which include beam shaping optics 404, The beam shaping optics 404 include a first lens (L1) 440, which receives light from a light source (not shown) and focuses it on a first cylindrical lens (C1) 442 and second cylindrical lens (C2) 444 Which act as a cylindrical telescope. The second cylindrical lens 444 provides the light to a second lens (L2) 446, which provides the light to a third lens (L3) 448. The beam shaping optics 404 provide the reshaped illumination sheet 410 to a fourth lens (L4) 450 which focuses the light onto a mirror 452. A fifth lens (L5) 454 directs light from the mirror 452 onto a scanning mirror 456, which redirects the light to a sixth lens (L6) 458, which provides the light to a seventh lens (L7) 460. An illumination objective 408 receives the light from the seventh lens 460 and directs it as illumination sheet 410 onto a cuvette sample holder 415 which contains the sample 414. The motion of the scanning mirror 456 may cause the illumination sheet 412 to scan up and down (e.g., along the y-axis) relative to the sample 414.

The collection optics 402 include a collection objective 416, which receives light from the sample 414 and directs it through a filter (BP-F) 462 to an eighth lens (L8) 464. The eighth lens 464 focuses the light onto a detector 420. The filter 462 may be a band pass filter. The detector 420 may be a sCMOS camera.

In a particular example implementation using the architecture of the mDSLM microscope 400, light enters the system using a 0.12 NA fiber-coupled laser as the light source and is collimated by lens L1 440 with a focal length (f) of about 19 mm (f=19 mm). The light is expanded in the y-direction using a 3× cylindrical telescope, C1 442 (f=0.50 mm) and C2 444 (f=150 mm). The light is then imaged by lenses L2 446 (f=50 mm), L3 448 (f=75 mm), and L4 450 (f=200 mm) onto a mirror 452 located in a conjugate front focal plane of the illumination objective 408. Light is collected by a scan lens, L5 454 (f=70 mm), and imaged onto a scanning mirror 456 positioned in a conjugate back focal plane of the illumination objective. The scanned light is imaged by a second scan lens, L6 458 (f=70 mm), and relayed to the back focal plane of the objective 408 by a tube lens, L7 460 (f=165 mm). Finally, the light is focused into the cuvette holder 415 and sample 414 by the illumination objective 408 (4×, NA=0.28), resulting in an effective illumination sheet with an NAx=0.06 and NAy=0.18. The excited fluorescence in the sample 414 is detected by a collection objective 416 (16×, NA=0.40), filtered by a bandpass filter BP-F 462 and imaged onto a sCMOS camera 420 using a tube lens, L8 464 (f=100 mm). The rolling shutter of the sCMOS camera 420 may act as a confocal aperture. The confocal aperture (or confocal slit) may have a width of about 20 μm. While particular focal lengths of lenses are given as an example, other focal lengths of lenses may be used in other examples.

Figure 5:
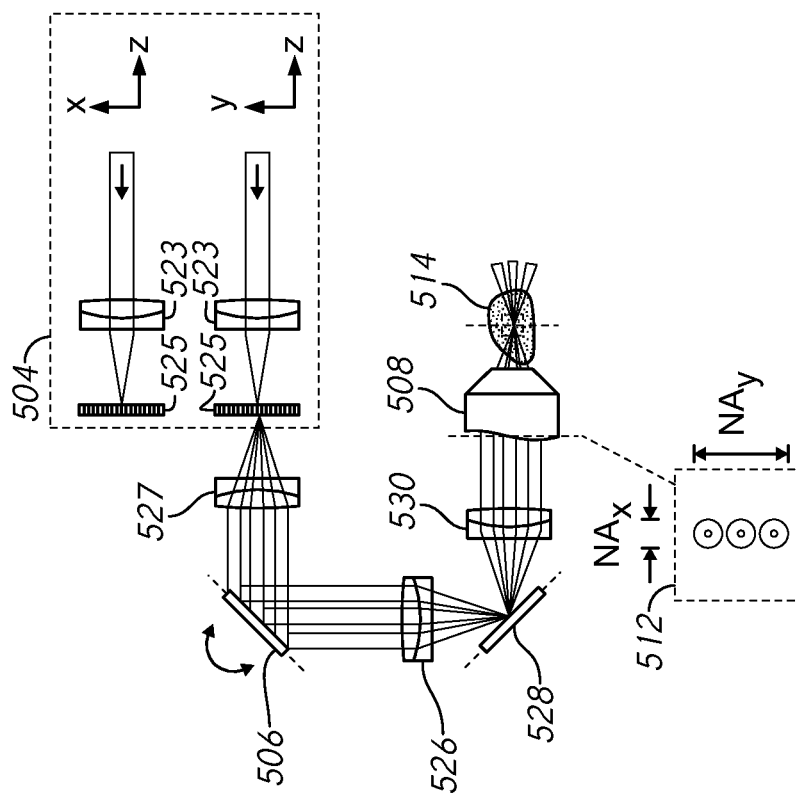
FIG. 5 is a schematic diagram of illumination optics which may be used provide an illumination sheet with a plurality of discrete beams according to an embodiment of the present disclosure.

FIG. 5 is a schematic diagram of illumination optics which may be used provide an illumination sheet with a plurality of discrete beams according to an embodiment of the present disclosure. FIG. 5 may generally be similar to FIG. 2, except that FIG. 5 may use different beam shaping optics 504 to generate a differently shaped illumination sheet 512. For the sake of brevity, features similar to those which have been previously described will not be described again with respect to FIG. 5.

The beam shaping optics 504 include a lens 523 which focuses light from the light source (not shown) onto a diffraction grating 525. The diffraction grating 525 may split the focused light into a plurality of light beams, which may generally be in the same plane (the y-z plane) but may be non-parallel and may diverge as the light leaves the diffraction grating 525. In some embodiments, only a certain number of the plurality of beams leaving the diffraction grating 525 may end up projected into the sample 514 as the illumination sheet 512. In some embodiments three discrete beams may make up the illumination sheet 512. In some embodiments, each of the discrete beams may be a Gaussian pencil beam.

A lens 527 may receive the divergent beams from the beam shaping optics 504, and may collimate the beams so that they are generally parallel to each other. The parallel beams may then be directed onto a scanning mirror 506, and other illumination optics which may generally be similar to the illumination optics 200 of FIG. 2.

The illumination sheet 512 may be directed onto a sample 514 such that the beams are convergent on a focal region which may lie within the sample 514. From the perspective of the focal region, the illumination sheet 512 may consist of light approaching from a plurality of discrete angles, each corresponding to one of the plurality of beams. The inset which shows the illumination sheet 512 shows that in cross-section, the illumination sheet 512 of the example of FIG. 5 has three beams, each of which has a generally circular cross-section. The three beams may generally be aligned along the y-axis. The overall illumination of the light sheet 512 may take on the general characteristics of a light sheet which has a larger numerical aperture along one axis than along an orthogonal axis (e.g., NAy is larger than NAx), even though it is made of discrete beams of light rather than the continuous illumination sheet described in FIGS. 2-4B.

Figure 6A:
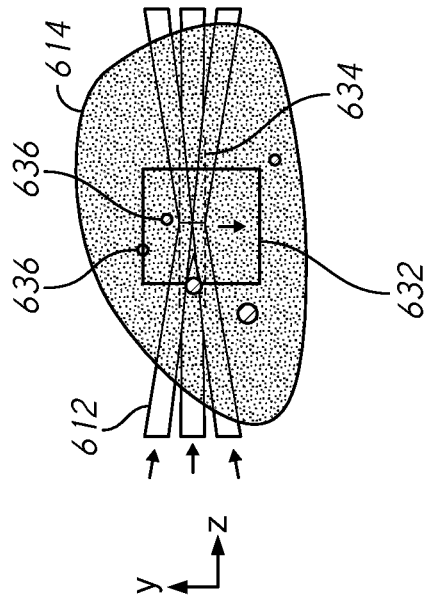
FIGS. 6A and 6B are block diagrams showing a top view and a side view, respectively, of the interaction of an illumination sheet with a sample according to an embodiment of the present disclosure
Figure 6B:
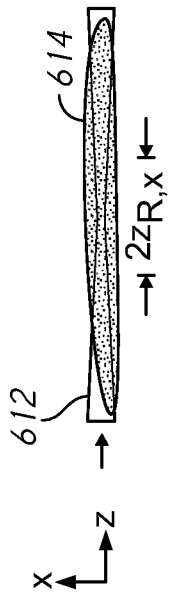

FIGS. 6A and 6B are block diagrams showing a top view and a side view, respectively, of the interaction of an illumination sheet with a sample according to an embodiment of the present disclosure. The illumination sheet 612 may be the illumination sheet 512 provided by the illumination optics 500 of FIG. 5. FIGS. 6A and 6B may generally be similar to FIGS. 3A and 3B, respectively, and for the sake of brevity features similar to those which have already been described will not be described again.

The illumination sheet 612 includes a plurality of separate beams, which are convergent at a focal point located within the box 632 representing the field of view of the collection optics. In the example embodiment of FIGS. 6A-6B, the illumination sheet 612 includes three discrete beams, each of which may have a generally circular cross-section. As may be seen, if the central beam of the illumination sheet 61 is blocked by an obstruction 636, light from the two outside beams may still pass around the obstruction 636, which may reduce the shadowed area behind the obstruction 636. This in turn, may allow for more even illumination throughout the depth of the sample 614. Since the illumination sheet 612 is relatively flat along the x-axis (as best seen in FIG. 6B), the illumination sheet 612 may extend through the sample for a long depth of illumination along the z-axis.

The illumination sheet 612 may be scanned across the field of view 632. The motion of the scanning mirror 506 of FIG. 5 may cause the illumination sheet 612 to move up and down (e.g., along the y-axis) relative to the sample 614. The dashed lines 634 represent the area in which light is accepted by a confocal slit. The confocal slit may also be scanned at a rate synchronized to the scan rate of the illumination sheet 612. For example, the confocal slit may be due to the rolling shutter of a digital camera, and may 'roll' across the detector at a rate synchronized to the scan rate of the illumination sheet 612. As may be seen in FIG. 6A, since the beams of the illumination sheet 612 are convergent within the box 632 which represents the field of view, most of the illumination light may generally fall within the dashed lines 634 that represent the accepted light of the confocal slit.

FIGS. 7A and 7B are schematic diagrams showing a side and top view, respectively, of an example implementation of a mDSLM microscope which uses an illumination sheet with multiple discrete beams according to an embodiment of the present disclosure. The mDSLM microscope 700 may be an implementation of the of the mDSLM system 100 of FIG. 1 using optics similar to those described in FIGS. 5-6B. The mDSLM microscope 700 may generally be similar to the mDSLM microscope 400 of FIG. 4, except in the mDSLM microscope 700, the illumination sheet 712 includes a plurality of discrete beams. For the sake of brevity, features similar to those which have been previously described with respect to FIG. 4 will not be described again with respect to FIGS. 7A-7B.

Figure 8:
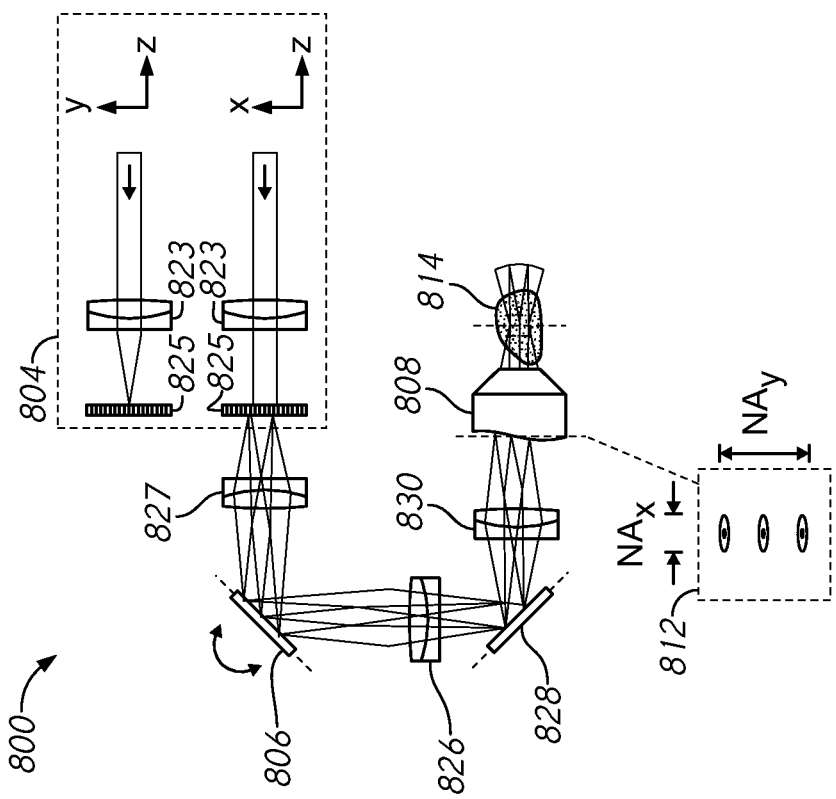
FIG. 8 is a schematic diagram of illumination optics which may be used provide an illumination sheet with a plurality of discrete sheets of light according to an embodiment of the present disclosure.

Light enters the example mDSLM microscope 700 using a 0.12 NA fiber-coupled laser as the light source (not shown) and is collimated by lens L1 740 with a focal length (f) of about 19 mm (f=19 mm). The light is focused to a point by lens L2 746 (f=50 mm) on a transmission diffraction grating, DG 743 (80 grooves/mm, Dynasil). The diffracted light (N=3 orders at −10, 0, and +10 deg.) is imaged by lens L3 748 (f=75 mm) and relayed by lens L4 750 (f=200 mm) onto a mirror 752 located in a conjugate front focal plane of the illumination objective 708. Light is collected by a scan lens, L5 754 (f=70 mm), and imaged onto a scanning mirror 756 positioned in a conjugate back focal plane of the illumination objective 708. The scanned light is imaged by a second scan lens, L6 758 (f=70 mm), and relayed to the back focal plane of the objective 708 by a tube lens, L7 760 (f=165 mm). Finally, the light is focused into the cuvette 715 and sample 714 by the illumination objective 708 (4×, NA=0.28), resulting in an effective illumination NAx=0.06 and NAy=0.18. The excited fluorescence from the sample 714 is detected by a collection objective 716 (16×, NA=0.40), filtered by a bandpass filter, BP-F 762, and imaged onto a sCMOS camera 720 using a tube lens, L8 764 (f=100 mm). The rolling shutter of the sCMOS camera 720 may act as a confocal aperture. The confocal aperture (or confocal slit) may have a width of about 20 μm. While particular focal lengths of lenses are given as an example, other focal lengths of lenses may be used in other examples FIG. 8 is a schematic diagram of illumination optics which may be used provide an illumination sheet with a plurality of discrete sheets of light according to an embodiment of the present disclosure. FIG. 8 may generally be similar to FIGS. 2 and 5, except that FIG. 8 may use different beam shaping optics 804 to generate a differently shaped illumination sheet 812. For the sake of brevity, features similar to those which have been previously described will not be described again with respect to FIG. 8.

The beam shaping optics 804 include a cylindrical lens 823 and a diffraction grating 825. The beam shaping optics 804 may receive light from a light source (not shown). The cylindrical lens 823 receives the light and focuses it onto the diffraction grating 825. The cylindrical lens 823 may have a larger optical power in the y-z plane than in the x-z plane. In some embodiments, the cylindrical lens 823 may have little or no optical power in the x-z plane. The cylindrical lens 823 may flatten the light into a generally planar shape. The diffraction grating 825 may split the planar light sheets into a plurality of light sheets, which may diverge as they leave the beam shaping optics 804. In some embodiments, only certain of the plurality of planar light sheets may reach the rest of the illumination optics. For example, in some embodiments, three planar light sheets may be used to form the illumination sheet 812.

The inset shows a cross section of the illumination sheet 812. The plurality of planar light sheets which form the illumination sheet 812 may interfere with each other. Accordingly, the cross section of the illumination sheet 812 may represent an interference pattern. As may be seen in the inset, although each of the light sheets may have relatively even illumination, when combined the interference pattern may have regions which have higher intensity than in other regions.

Figure 9A:
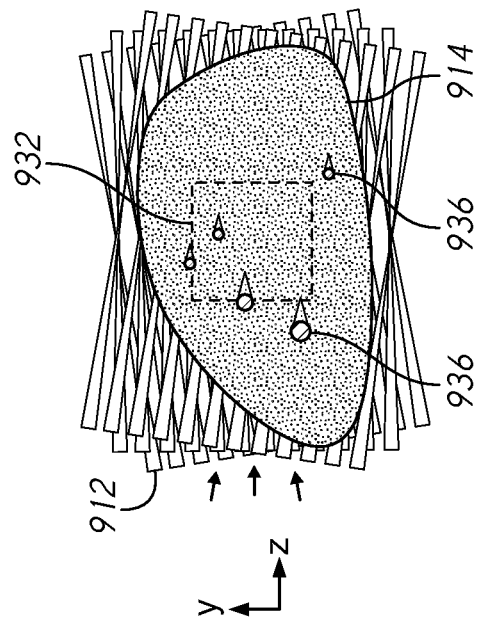
FIGS. 9A and 9B are block diagrams showing a top view and a side view, respectively, of the interaction of an illumination sheet with a sample according to an embodiment of the present disclosure.
Figure 9B:
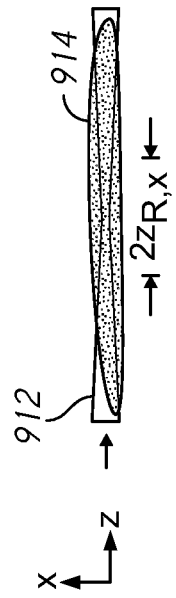

FIGS. 9A and 9B are block diagrams showing a top view and a side view, respectively, of the interaction of an illumination sheet with a sample according to an embodiment of the present disclosure. The illumination sheet 912 may be the illumination sheet 812 provided by the illumination optics 800 of FIG. 8. FIGS. 9A and 6B may generally be similar to FIGS. 3A and 6A and 3B and 6B, respectively, and for the sake of brevity features which similar to those which have already been described will not be described again.

Since the plurality of light sheets may be focused such that they converge at a focal point within the field of view 932, there may be a wide range of angular diversity in one plane (e.g., the y-z plane). As may be seen, this range of angular diversity may allow light to pass around obstructions 936 in order to provide more even illumination of the sample 914. From the perspective of the focal point, light may approach at a plurality of discrete angles, each of which may correspond to one of the plurality of light sheets in the illumination sheet 912.

Unlike previously described embodiments, the plurality of overlapping light sheets in the illumination sheet 912 may provide illumination across an area larger than the field of view 932. For this reason, it may not be necessary to scan the illumination sheet 912 with respect to the field of view 932. Accordingly, in some embodiments, the collection optics may capture a widefield field of view. In some embodiments, rather than using a confocal aperture, the collection optics may collect light from entire field of view simultaneously.

The illumination sheet 912 may have an interference pattern due to the overlapping plurality of light sheets. In some embodiments, the scanning mirror 806 of FIG. 8 may be moved to 'dither' the illumination sheet 912 with respect to the sample 914. The illumination sheet 912 may be moved up and down (e.g., along the y-axis) with respect to the sample 914. This may help to 'even out' inconsistencies in the intensity of illumination in the illumination sheet 912 due to the interference pattern.

Figures 10A, 10B:
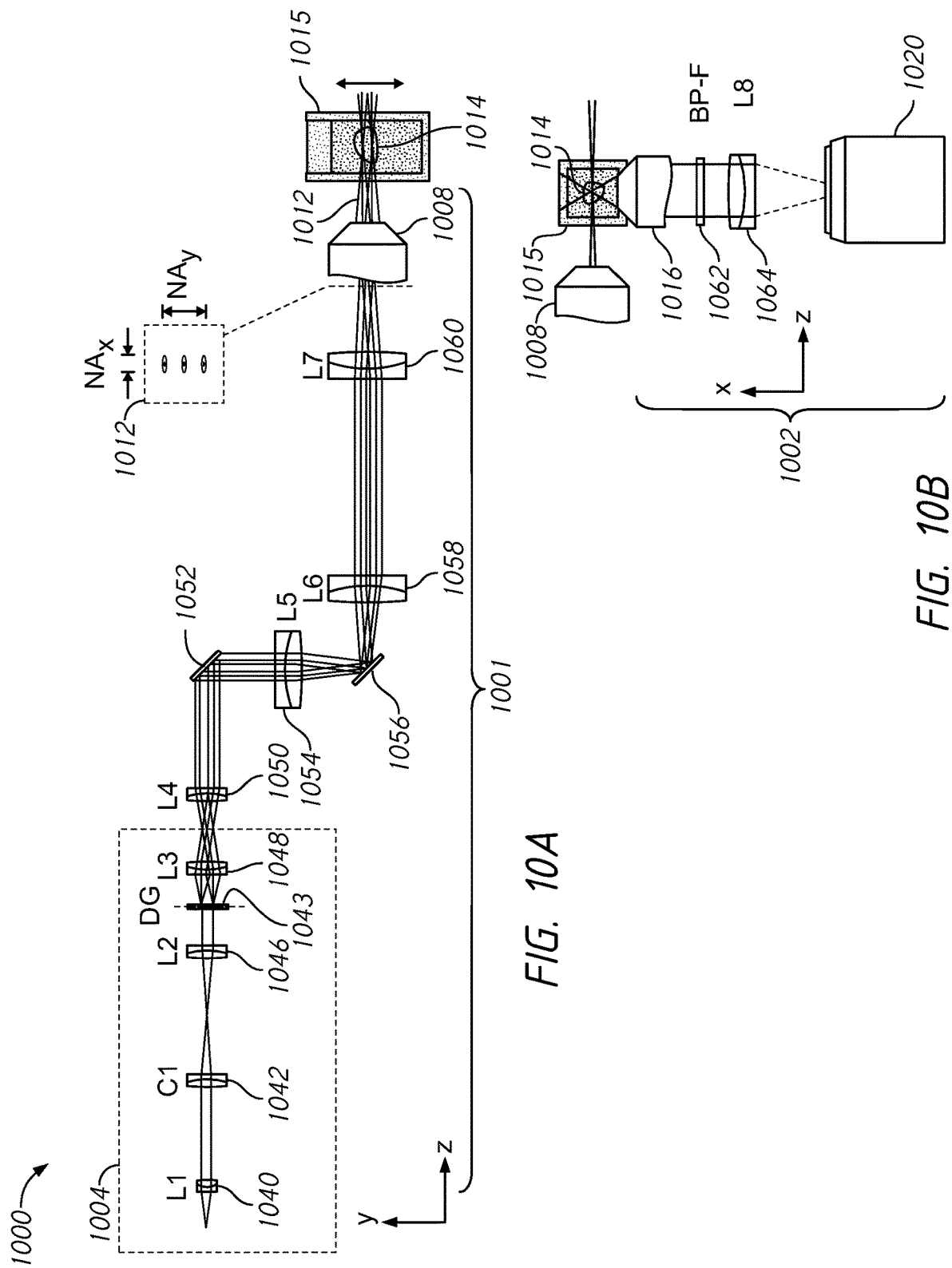
FIGS. 10A and 10B are schematic diagrams showing a side and top view, respectively, of an example implementation of a mDSLM microscope which uses an illumination sheet with multiple overlapping light sheets according to an embodiment of the present disclosure.

FIGS. 10A and 10B are schematic diagrams showing a side and top view, respectively, of an example implementation of a mDSLM microscope which uses an illumination sheet with multiple overlapping light sheets according to an embodiment of the present disclosure. The mDSLM microscope 1000 may be an implementation of the of the mDSLM system 100 of FIG. 1 using optics similar to those described in FIGS. 8-9B. The mDSLM microscope 1000 may generally be similar to the mDSLM microscope 400 of FIGS. 4A-4B and the mDSLM microscope 700 of FIGS. 7A-7B, except in the mDSLM microscope 1000, the illumination sheet 1012 includes a plurality of overlapping light sheets. For the sake of brevity, features similar to those which have been previously described with respect to FIGS. 4A-4B and FIGS. 7A-7B will not be described again with respect to FIGS. 10A-10B.

Light enters the system using a 0.12 NA fiber-coupled laser acting as the light source (not shown) and is collimated by lens L1 1040 with a focal length (f) of about 19 mm (f=19 mm). The light is focused to a line by cylindrical lens C1 1042 (f=50 mm), and refocused by lens L2 1046 (f=50 mm) onto a transmission diffraction grating, DG 1043 (80 grooves/mm, Dynasil). The diffracted light (N=3 orders at −10, 0, and +10 deg.) is imaged by lens L3 1048 (f=75 mm) and relayed by lens L4 1050 (f=200 mm) onto a mirror 1052 located in a conjugate front focal plane of the illumination objective 1008. Light is collected by a scan lens, L5 1054 (f=70 mm), and imaged onto a scanning mirror 1056 positioned in a conjugate back focal plane of the illumination objective 1008. The scanned light is imaged by a second scan lens, L6 1058 (f=70 mm), and relayed to the back focal plane of the objective 1008 by a tube lens, L7 1060 (f=165 mm). Finally, the light is focused into the cuvette 1015 and sample 1014 by the illumination objective 1008 (4×, NA=0.28), resulting in an effective illumination NAx=0.06 and NAy=0.18 in the illumination sheet 1012. The excited fluorescence from the sample 1014 is detected by a collection objective 1016 (16×, NA=0.40), filtered by a bandpass filter, BP-F 1062, and imaged onto a sCMOS camera 1020 using a tube lens, L8 1064 (f=100 mm). While particular focal lengths of lenses are given as an example, other focal lengths of lenses may be used in other examples Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a light source configured to emit a beam of light;
   illumination optics configured to provide an illumination sheet based on the beam of light and illuminate a sample with the illumination sheet, the illumination sheet having a first angular diversity along a first axis and a second angular diversity along a second axis orthogonal to the first axis, wherein the first angular diversity is greater than the second angular diversity, wherein the illumination sheet has a first numerical aperture along the first axis and a second numerical aperture along the second axis and wherein the first numerical aperture is greater than the second numerical aperture; and
   collection optics configured to receive light from the sample along the second axis.

2. The apparatus of claim 1, wherein the illumination optics comprise beam shaping optics configured to passively reshape the beam of light into the illumination sheet.

3. The apparatus of claim 2, wherein the beam shaping optics comprise a cylindrical telescope.

4. The apparatus of claim 2, wherein the beam shaping optics are configured to split the beam of light into a plurality of illumination beams; wherein each of the illumination beams lies in a plane and wherein each of the illumination beams has a different angle in the plane.

5. The apparatus of claim 4, wherein the beam shaping optics comprise a diffraction grating.

6. The apparatus of claim 4, wherein each of the plurality of illumination beams is a Gaussian pencil beam.

7. The apparatus of claim 4, wherein each of the plurality of illumination beams is a light sheet, and wherein the plurality of light sheets overlap with each other.

8. The apparatus of claim 7, further comprising scanning optics configured to dither the illumination sheet with respect to the sample.

9. The apparatus of claim 1, wherein the sample comprises obstructions and wherein the illumination sheet is configured to illuminate regions of the sample occluded by the obstructions based on the first angular diversity.

10. The apparatus of claim 1, wherein the sample comprises at least one fluorophore, and wherein the illumination sheet is configured to excite the at least one flourophore.

11. The apparatus of claim 10, wherein the collection optics are configured to receive emission light emitted by the excited ones of the at least one flourophores.

12. The apparatus of claim 1, wherein the sample is a biological tissue.

13. The apparatus of claim 1, further comprising:
scanning optics configured to scan the illumination beam along the first axis across the sample; and
a detector coupled to the collection optics and configured to image a plane comprising the second axis and a third axis orthogonal to the first and the second axis based on the received light.

14. The apparatus of claim 13, further comprising a confocal aperture configured to reject out of focus portions of the light from the sample.

15. The apparatus of claim 14, wherein a rolling shutter of the detector is configured to act as the confocal aperture.

16. The apparatus of claim 15, wherein a speed of the rolling shutter is synchronized to a scan rate of the scanning optics.

17. A method comprising:
directing an illumination sheet at a sample, the illumination sheet comprising a first angular diversity along a first axis and a second angular diversity along a second axis orthogonal to the first axis, wherein the first angular diversity is greater than the second angular diversity, wherein the illumination sheet has a first numerical aperture along the first axis and a second numerical aperture along the second axis, and wherein the first numerical aperture is greater than the second numerical aperture; and
receiving light from the sample, wherein the received light is based on the illumination sheet.

18. The method of claim 17, wherein the sample comprises at least one fluorophore, and wherein the illumination sheet comprises an excitation wavelength of the at least one fluorophore and the received light comprises an emission wavelength of the at least one fluorophore.

19. The method of claim 17, further comprising:
generating illumination light from a light source; and
shaping the illumination light into the illumination sheet.

20. The method of claim 19, wherein the shaping the illumination light into the illumination sheet comprises splitting the illumination light into a plurality of illumination beams, wherein each of the plurality of illumination beams approaches a focal point in the sample from a different angle.

21. The method of claim 20, wherein each of the plurality of illumination beams comprises a light sheet, the method further comprising dithering the illumination sheet with respect to the sample.

22. The method of claim 17, wherein the shaping the illumination light into the illumination sheet comprises changing the size of the illumination light along one of the first or the second axis with a cylindrical telescope.

23. The method of claim 17, further comprising scanning the illumination sheet across the sample.

24. The method of claim 17, further comprising rejecting an out of focus portion of the received light from the sample with a confocal aperture.

* * * * *